June 23, 1942.  C. A. FORD, JR  2,287,375
COMBINED HAY RAKE AND STACKER
Filed Oct. 5, 1940  2 Sheets-Sheet 1
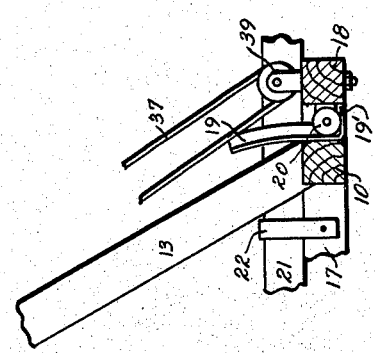
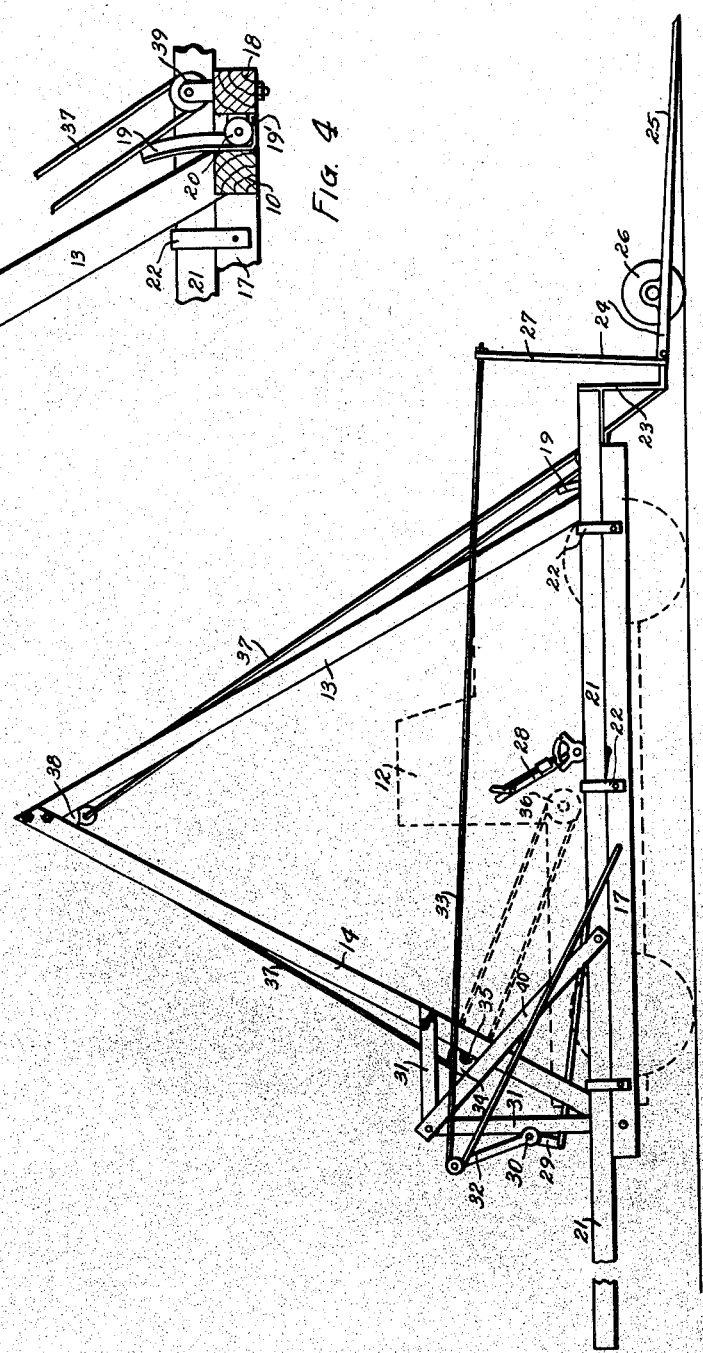
Inventor:
Clyde A. Ford, Jr
By Homer S. Sweet,
Attorney

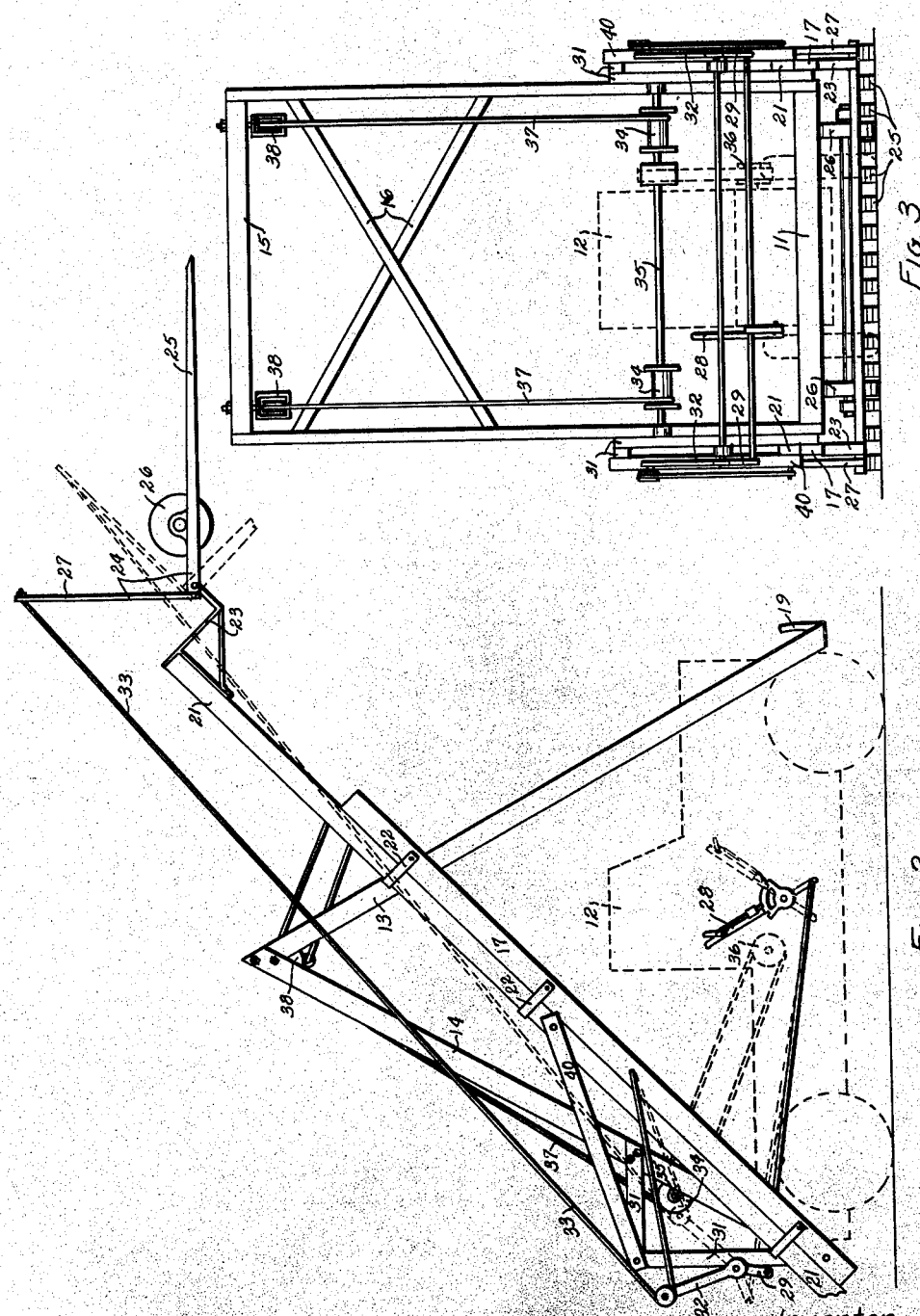

Patented June 23, 1942

2,287,375

UNITED STATES PATENT OFFICE 2,287,375

COMBINED HAY RAKE AND STACKER

Clyde A. Ford, Jr., Olney Springs, Colo.

Application October 5, 1940, Serial No. 359,846

4 Claims. (Cl. 214—141)

This invention relates to apparatus for raking and stacking hay in the field, and has as an object to provide an improved arrangement and combination of elements constituting such a device.

A further object of the invention is to provide an improved unitary association of elements constituting hay raking and stacking means susceptible of operative association with a conventional powered vehicle.

A further object of the invention is to provide an improved unitary assembly of elements operable in association with a powered vehicle to gather, transport, elevate, and stack hay and similar material in the field.

A further object of the invention is to provide improved means for operatively mounting, propelling, selectively elevating, and dumping a rake unit employed in the gathering and stacking of hay.

A further object of the invention is to provide an improved hay raking and stacking device that is simple and inexpensive of manufacture, that is designed for convenient operative association with conventional powered vehicles, that is positive and efficient in the accomplishment of the purposes for which designed, and which is productive of economy in time and effort when applied to the harvesting of hay crops.

My invention consists in the construction, arrangement, and combination of elements hereinafter set forth, pointed out in my claims, and illustrated by the accompanying drawings, in which—

Figure 1 is a side elevation of the improved apparatus as assembled for practical use and mounted in operative association with a powered vehicle, the latter being shown in broken lines, and with the elements of the apparatus in hay raking or gathering position. Figure 2 is a view similar to Figure 1 illustrating selectively adjustable elements of the apparatus in alternative position. Figure 3 is a rear end elevation of the apparatus shown in Figure 1. Figure 4 is a fragmentary, detail section, on an enlarged scale, taken through certain of the forward transverse elements of the assembly.

In the construction of the apparatus as shown, a rigid frame adapted to be secured to and mounted for transportation with a powered vehicle is illustrated as consisting of a pair of spaced, parallel beams 10 and 11 adapted to be horizontally disposed transversely of the front and rear ends of a powered vehicle, indicated at 12, and suitably secured to rigid elements of said vehicle for convenient removal and replacement. The beams 10 and 11 may be clamped or bolted to frame members of the vehicle, to bumper brackets, fender arms, or any such suitable supports, and are so adjusted in length and positioned on the vehicle as to extend at each end laterally beyond the vehicle side margins. Similar frame members 13 and 14 are securely fixed at their lower ends to corresponding ends of the beams 10 and 11 and converge upwardly from said beams in a vertical plane perpendicular to that containing said beams to meet and be rigidly secured together to form an inverted V structure on each side of the vehicle 12. There are two sets of members 13 and 14 which rise from opposite ends of the beams 10 and 11 to form parallel, spaced, identical structures which are rigidly interconnected at their apices as by means of a transverse beam 15 to complete the frame. When necessary or desirable, braces 16 may be suitably disposed between and connected to the frame elements to strengthen and stiffen the frame assembly.

An arm 17 having a length somewhat in excess of the spacing between the beams 10 and 11 is pivoted adjacent its rear end to one outer end of the beam 11 and is thereby disposed to swing in a vertical arc exteriorly of and adjacent the members 13 and 14, one of said arms 17 being disposed on each side of the frame assembly. The free ends of the arms 17 project somewhat forwardly beyond the beam 10 and are rigidly yoked together by means of a transverse member 18 which is disposed to lie parallel with and just forwardly of the beam 10 when the arms 17 are in horizontal position. To position and hold said arms 17 in normal parallel relation with the ground and to relieve the pivotal mountings of said arms from undue pressures developed through operation of the apparatus, suitable, relatively-short, channel tracks 19 are fixed to and extend in spaced relation upwardly from the forward face of the beam 10 with their channels opening toward the beam 18, and suitable roller assemblies 20 are fixed to the rear face of the beam 18 for engagement within and rolling contact against the tracks 19 as the yoked arms 17 are actuated, said tracks 19 being rearwardly curved in their upward extensions to conform with the arcuate travel of the roller assemblies 20, and the lower ends of said tracks being bent upwardly and forwardly to provide a stop 19' against which the roller assemblies may rest when the arms 17 are substantially horizontal.

An extension arm 21 having a length greater than that of the corresponding arm 17, is superposed on and arranged to slide longitudinally of each of the arms 17, and suitable yokes 22 are fixed in spaced relation to and rise from each of the arms 17 to loosely embrace the associated arm 21 and prevent divergence or lateral separation therebetween. The forward ends of the arms 21 project beyond the corresponding ends of the arms 17 and fixedly support depending brackets 23 whereto is hinged a wheeled rake assembly 24, disposed for operative extension forwardly of the apparatus. The rake assembly 24 may be conventional in construction and of that type commonly known as a "bull rake" or "sweep rake," and includes a plurality of spaced, parallel, forwardly-extending tines or fingers 25 disposed closely parallel to the ground in a frame which is supported by ground-engaging wheels 26 and tiltable to vary the attitude of the tines 25 relative to the ground through actuation of an arm or lever 27 fixed to and rising from a rear portion of the rake frame. Adjustment of the attitude of the rake assembly 24 may conveniently be had through manipulation of a detent and quadrant hand lever 28 carried by the vehicle 12, the lower end of said lever being linked to an arm 29 depending from and in fixed relation with a rock shaft 30 disposed transversely of and rearwardly on an extension 31 from the frame assembly, so that actuation of said lever serves to oscillate said rock shaft for corresponding oscillation through a vertical arc of an arm 32 fixed to and extending upwardly from the shaft 30. The upper end of the arm 32 carries a pulley which engages in the bend of a cable 33, or similar flexible connection, which is secured at one end to the upper extremity of the arm 27 and at its other end to a point intermediate the ends of the arm 17, the length of said cable 33 being such as to hold the tines 25 out of ground engagement when the lever 28 is at one limit of its range of actuation.

The arrangement and combination of elements thus far described provides a powered rake which may be propelled about a field through the agency of the vehicle 12 to gather and pick up on the tines 25 hay and similar material which has been cut and left lying on the ground or which has been previously gathered into windrows or cocks, adjustment of the spacing between the tines 25 and the ground surface being conveniently had through manipulation of the lever 28, the tracks 19 and rollers 20 engaged therein serving to maintain the rake assembly in the desired position forward of the vehicle against the pressures developed through the raking operation.

To elevate and position for dumping the load of hay gathered by the rake assembly 24, means are provided for swinging the arms 17 about their pivotal mountings and for extending the arms 21 relative to their supporting arms 17, which means include a pair of drums 34 fixed in spaced relation on a shaft 35 which is disposed for rotation transversely of the main frame assembly and between the extension frames 31. The shaft 35 is operatively connected with a power take-off 36 of the vehicle 12 through suitable clutch means normally associated with said power take off and in a manner which permits selective power rotation of said shaft 35 in either direction. A flexible cable 37, or equivalent element, is fixed at one end to each of the drums 34, is led over a pulley 38 fixed to and in depending relation with the transverse beam 15, extends to and about a pulley 39 fixed to and disposed above the member 18, and is then secured at its other end to the pulley 38, so that rotation of the drums 34 in one direction acts to wind the cables 37 thereon and swing the arms 17, member 18, arms 21, and rake assembly 24 through a vertical arc upwardly and about the pivotal mountings of said arms 17, while rotation of said drums in the opposite direction acts to lower the swingable assembly into the limiting position determined by engagement of the rollers 20 against the flanges or stops 19' of the tracks 19. The extension frame 31 pivotally supports at its rearward angle one end of a link 40 which is pivotally connected at its other end with an intermediate point on the arm 21, the length of the link 40 being so selected as to cause its connected arm 21 to move forwardly and outwardly along the corresponding arm 17 as the latter is arcuately elevated, such travel of the arms 21 relative to their supporting arms 17 serving to extend the rake assembly 24 forward from its normal position and in clearing relation with the frame assembly and vehicle as said rake and its load is elevated. The disposition of the cable 33, as hereinabove described, is such as to maintain the rake assembly 24 in normal load-supporting position during upward and outward travel of the arms 21, as is clearly shown in Figure 2, and dumping of the load from the rake assembly is accomplished when the latter is elevated through manipulation of the lever 28, the rake tines 25 swinging downwardly as said lever is actuated to permit the load of hay to slide by gravity therefrom for deposit in such position as the operator may select through control and operation of the vehicle 12.

As will be apparent from the foregoing, the apparatus is designed for convenient attachment to and removal from a powered vehicle thus freeing the power unit for other uses when the rake and stacker is not needed. When associated with the vehicle, the apparatus may be controlled by a single operator to travel about a field, gather and pick up hay, transport the gathered hay to any desired point, elevate the load in clearing relation with the apparatus, and dump the load from an elevation which permits adequate stacking. The use of the improved apparatus eliminates much of the labor and equipment now commonly employed in similar operations and hence results in substantial economy of time and effort.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention—

1. Apparatus of the character described, comprising, a rigid frame adapted to be secured to and carried by a powered vehicle, a yoke pivoted to one end of and in embracing relation with said frame for actuation through a vertical arc, means and connections between said yoke and the power unit of said vehicle selectively operable to swing said yoke relative to said frame, arms slidably associated with the side members of said yoke, a rake assembly hingedly carried by the forward ends of said arms, links engaging between said arms and frame to extend the former forwardly of said yoke as the yoke is swung upwardly relative to said frame, flexible, non-extensible connections engaging between yoke side members and upright portions of said rake assembly and about idler rollers carried by said frame above the pivotal axis of said yoke, whereby said rake assembly is normally maintained in load-carrying attitude during actuation of said yoke, and manually-operable means for shifting said idler rollers longitudinally of said frame to vary the attitude of said rake assembly.

2. Apparatus of the character described, comprising, a rigid frame adapted to be secured to the opposite ends of a powered vehicle, a yoke hinged at its open end to the rearward end of said frame in embracing relation with said frame and vehicle and thus disposed for actuation through a vertical arc, means on said yoke and the forward end of said frame interengageable to normally support said yoke in substantially horizontal position at the lower limit of its range of travel, selectively-operable means and connections for swinging said yoke upwardly relative to said frame, arms slidably associated with side members of said yoke, a rake assembly hingedly carried by and projecting forwardly of the forward ends of said arms, links connecting between said arms and said rigid frame to extend the former forwardly of said yoke as the yoke is swung upwardly, means, including flexible, non-extensible connections engaging between the yoke side members and upright portions of said rake assembly and about idler rollers carried by said frame above the pivotal axis of said yoke, operable to maintain said rake assembly in load-carrying attitude during upward travel of said yoke, and manually-operable means for shifting said idler rollers forwardly of said frame to dump said rake.

3. The operative combination with a powdered vehicle of a rigid frame carried by and rising above said vehicle, a yoke pivoted at its open end to a rear portion of said frame for actuation through a vertical arc in embracing relation with said frame, connections between the power unit of said vehicle and the free end of said yoke selectively operable to swing said yoke relative to said frame, a rake assembly slidably associated in forwardly-projecting relation with the closed end of said yoke, means automatically operable to extend said rake assembly forwardly relative to said yoke during upward travel of the latter, flexible, non-extensible connections engaging between the yoke side members and upright portions of said rake assembly and about idler rollers carried by said frame above the pivotal axis of said yoke to normally maintain said rake assembly in load-carrying attitude during actuation of said yoke, and manually-operable means for shifting said idler rollers longitudinally of said frame to vary the attitude of said rake assembly.

4. In apparatus of the character described having a powdered vehicle, a rigid frame carried by and rising above said vehicle, a yoke pivoted at its open end to and for actuation through a vertical arc in embracing relation with said frame, means and connections selectively engageable with the power unit of said vehicle to swing said yoke relative to said frame, a hingedly-mounted rake assembly slidably associated in forwardly-projecting relation with the free end of said yoke, and means automatically operable to project said rake assembly forwardly of said yoke during upward travel of the latter, means for maintaining said rake in load-carrying attitude during its upward and outward travel and selectively tilting said rake to dump its load, said means comprising idler rollers on the rear portion of said frame above the yoke hinge, manually-operable means for shifting said rollers longitudinally of said frame, and flexible, non-extensible connections engaging about said rollers between upright portions of the rake assembly and points on the yoke arms forwardly of the yoke hinge.

CLYDE A. FORD, Jr.

CERTIFICATE OF CORRECTION.

Patent No. 2,287,375. June 23, 1942.

CLYDE A. FORD, JR.

It is hereby certified that error appears in the printed specification of the above numbered patent requiring correction as follows: Page 3, first column, line 38, claim 3, and second column, line 19, claim 4, for "powdered" read --powered--; and that the said Letters Patent should be read with this correction therein that the same may conform to the record of the case in the Patent Office.

Signed and sealed this 25th day of August, A. D. 1942.

(Seal)

Henry Van Arsdale,
Acting Commissioner of Patents.